United States Patent
Li et al.

(10) Patent No.: US 7,200,196 B2
(45) Date of Patent: Apr. 3, 2007

(54) INTERPOLATION BASED TIMING RECOVERY

(75) Inventors: Xiaohui Li, College Station, TX (US); Henry Kin-Chuen Kwok, Fremont, CA (US)

(73) Assignee: Texas Instruments Incorporated, Dallas, TX (US)

( * ) Notice: Subject to any disclaimer, the term of this patent is extended or adjusted under 35 U.S.C. 154(b) by 719 days.

(21) Appl. No.: 10/422,316

(22) Filed: Apr. 24, 2003

(65) Prior Publication Data

US 2004/0213337 A1    Oct. 28, 2004

(51) Int. Cl.
*H04L 7/00*    (2006.01)

(52) U.S. Cl. .................. 375/355; 375/220; 375/221; 375/260; 375/352; 375/354; 375/371; 370/401

(58) Field of Classification Search ........... 375/220, 375/222, 260, 352, 354, 355, 371, 221; 370/401
See application file for complete search history.

(56) References Cited

U.S. PATENT DOCUMENTS

| | | | | |
|---|---|---|---|---|
| 5,278,865 | A * | 1/1994 | Amrany et al. ............ | 375/222 |
| 6,522,265 | B1 * | 2/2003 | Hillman et al. ............ | 340/988 |
| 6,771,590 | B1 * | 8/2004 | Marchok et al. ........... | 370/207 |
| 6,985,548 | B1 * | 1/2006 | Jabbar et al. .............. | 375/355 |
| 2003/0053531 | A1 * | 3/2003 | Agazzi ..................... | 375/220 |
| 2003/0152177 | A1 * | 8/2003 | Cahill-O'Brien et al. .. | 375/354 |
| 2003/0231714 | A1 * | 12/2003 | Kjeldsen et al. ........... | 375/259 |
| 2004/0047463 | A1 * | 3/2004 | Hwang ..................... | 379/387.01 |

OTHER PUBLICATIONS

Evans, Mark, Ultra320 SCSI Meets The Challenges—Technology Information, Computer Technology Review, Jun. 2001, found Jul. 6, 2006 at http://www.findarticles.com/p/articles/mi_m0BRZ/is_6_21/ai_77610586.*

* cited by examiner

*Primary Examiner*—David C. Payne
*Assistant Examiner*—Erin M. File
(74) *Attorney, Agent, or Firm*—Steven A. Shaw; W. James Brady; Frederick J. Telecky, Jr.

(57) ABSTRACT

The present invention provides a solution that eliminates both the voltage-controlled oscillator ("VXCO" 105) and its associated D/A converter (120) from the timing recovery scheme, thereby significantly reducing manufacturing costs for modems, such as asymmetric digital subscriber loop ("ADSL") modems. The present invention also enables tracking of a wider frequency offset. The present invention provides this with a novel timing recovery scheme implemented entirely in the digital domain. The present invention includes a free running clock (205) as the sampling clock for the A/D (110) and D/A (115) converters, and interpolators (210, 220, 615 and 635) to correct timing errors for both the receive and transmit samples. The desired sample can be obtained based on its timing offset and its neighboring samples.

19 Claims, 7 Drawing Sheets

INTERPOLATION BASED TIMING RECOVERY

FIELD OF THE INVENTION

The invention relates generally to telecommunications and, more particularly, to an interpolation based timing recovery scheme for asymmetric digital subscriber line ("ADSL") modems.

BACKGROUND OF THE INVENTION

The increased use of telephone twisted pair wiring for data communications has resulted in a push for faster modems and improved signaling protocols compatible with the public switched telephone network ("PSTN"). Examples of these improved protocols include a variety of digital subscriber line ("DSL") communications such as asymmetric digital subscriber line ("ADSL"), symmetric digital subscriber line ("SDSL"), hi-bit rate digital subscriber line ("HDSL") and very high rate digital subscriber line ("VDSL"). Each DSL variant represents a different transmission speed over a different distance of copper pair wiring.

ADSL offers differing upload and download speeds and can be configured to deliver in excess of eight (8) megabits of data per second (8000K) from the network to the customer. This is more than 120 times faster than dial-up service and 100 times faster than integrated services digital network ("ISDN"). ADSL enables voice and high speed data to be sent simultaneously over the existing telephone line. ADSL uses the existing analog local loop lines for digital data transfer (to and from the remote location). It shares the bandwidth of the local loop with the existing phone system and does not require modification to the central office ("CO") switch. It is asymmetrical because the upstream transfer rate is slower than the downstream data rate. This means that the data transfer from the remote location to the CO is a different rate than the data transfer rate from the CO to the remote location.

For an ADSL based service, ADSL modems at the CO exchange data through telephone wiring with compatible ADSL modems at remote locations. The ADSL modems at the CO also exchange data with servers. The central office modem is sometimes referred to as an ADSL Transceiver Unit-Central Office or "ATU-C." The remotely located ADSL modem is sometimes referred to as an ADSL Transceiver UNIT-Remote or "ATU-R." Any telephone equipment that may be in use at the remote location is connected to the same telephone wiring as the ATU-R. In an ADSL environment, the ATU-R is responsible for loop timing, i.e., synchronizing both its receiver and transmitter to the clock from the CO so that reliable communications can be achieved in both directions between the ATU-C and the ATU-R.

Timing recovery schemes are used to obtain synchronization by altering the sampling frequency and sampling phase to sample the estimated transmitted signal at its peak. Because the frequency of the oscillator at the ATU-R does not exactly match the frequency of the oscillator at the ATU-C, demodulation brings the signal to near baseband with some frequency offset. Timing recovery schemes remove (i.e., compensate for) the frequency offset so that the signal can be processed at baseband.

Almost all of the timing recovery schemes implemented on current ADSL modems use voltage-controlled crystal oscillator ("VCXO") devices. FIG. 1 diagrammatically illustrates conventional VCXO-based timing recovery, in which the digital side is enclosed in dashed block 170. The clock from VCXO 105 is used as the sampling clock for A/D converter 110, which receives analog signal 101 and converts it to digital, and for D/A converter 115, which transmits analog signal 103. Time domain equalizer ("TEQ") 125 receives the digital signal from A/D 110 and shortens the length of the channel to less than the length of the cyclic prefix, i.e. it shortens the channel impulse response ("CIR"). Fast Fourier Transform ("FFT") 130 receives the signal from TEQ 125 and converts the time domain symbols to the frequency domain. Converted signal 133 is then transmitted out of block 170 to frequency domain equalizer ("FEQ") 150 and within block 170 to phase error extractor 135. Signal 133 is processed successively through FEQ 150, Viterbi decoder 152, deinterleaver 154, RS decoder 156 and descrambler 158 to host microprocessor interface 160 for transmission to host microprocessor 180. A signal sent from microprocessor 180 is processed successively through interface 160, scrambler 162, RS encoder 164, interleaver 166, trellis encoder 168, gain adjuster 170 and Inverse FFT ("IFFT") 172 for transmission by D/A 115.

Within block 170, phase error extractor 135 extracts phase error signal 137 and feeds signal 137 to Digital Phase Locked Loop ("PLL") 140. PLL 140 tracks the frequency offset of signal 137, sending the estimated frequency offset as signal 143 to D/A 120 for conversion into an analog signal that is used to control VCXO 105. D/A converters, such as D/A 120, and VCXO devices, such as VCXO 105, are expensive devices. The cost of an ATU-R can be significantly reduced if both the VCXO, such as VCXO 105, and its associated D/A converter, such as D/A 120, can be eliminated. Additionally, VCXO-based timing recovery schemes are generally only capable of tracking a maximum offset of 100 ppm.

It is therefore desirable to provide a solution that eliminates both the VXCO and its associated D/A converter from the timing recovery scheme, thereby significantly reducing manufacturing costs, and that enables tracking of a wider frequency offset. The present invention provides this with a novel timing recovery scheme implemented entirely in the digital domain. Exemplary embodiments of the present invention include a free running clock as the sampling clock for the A/D and D/A converters, and interpolators to correct timing errors for both the receive and transmit samples. The desired sample can be obtained based on its timing offset and its neighboring samples.

BRIEF DESCRIPTION OF THE DRAWINGS

The above and further advantages of the invention may be better understood by referring to the following description in conjunction with the accompanying drawings in which corresponding numerals in the different figures refer to the corresponding parts, in which.

DETAILED DESCRIPTION

While the making and using of various embodiments of the present invention are discussed herein in terms of specific modems and filters, it should be appreciated that the present invention provides many inventive concepts that can be embodied in a wide variety of contexts. The specific embodiments discussed herein are merely illustrative of specific ways to make and use the invention, and are not meant to limit the scope of the invention.

Figure 1:
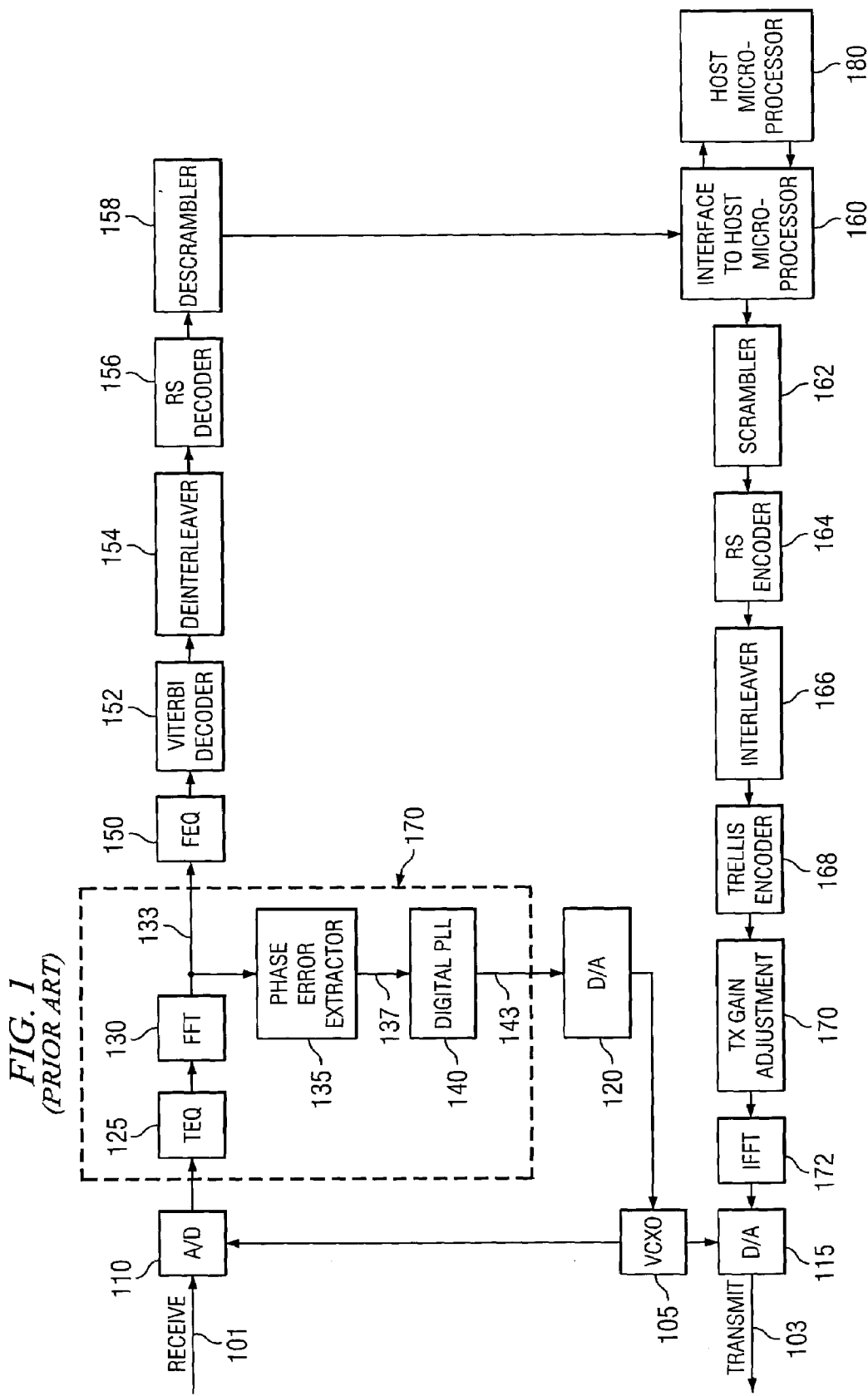
FIG. 1 diagrammatically illustrates conventional VCXO-based timing recovery in accordance with the known art.

The present invention provides a solution that eliminates both the voltage-controlled oscillator ("VXCO" 105, FIG. 1) and its associated D/A converter (120, FIG. 1) from the timing recovery scheme, thereby significantly reducing manufacturing costs for modems, such as asymmetric digital subscriber loop ("ADSL") modems. The present invention provides a novel timing recovery scheme implemented entirely in the digital domain. The present invention includes a free running clock (205, FIGS. 2 and 6) as the sampling clock for the A/D (110, FIGS. 1, 2 and 6) and D/A (115, FIGS. 1, 2 and 6) converters, and interpolators (210 and 220, FIG. 2, and 615 and 635, FIG. 6) to correct inaccurate timing errors for both the receive and transmit samples. The desired sample can be obtained based on its timing offset and its neighboring samples. The tracking ability of the present invention is only limited by the tracking ability of Digital Phase Locked Loop ("PLL") 140. Further, because the present invention can be implemented entirely in the digital domain, implementation costs can be further reduced as more advanced very large scale integration ("VLSI") process technologies are utilized.

Figure 2:
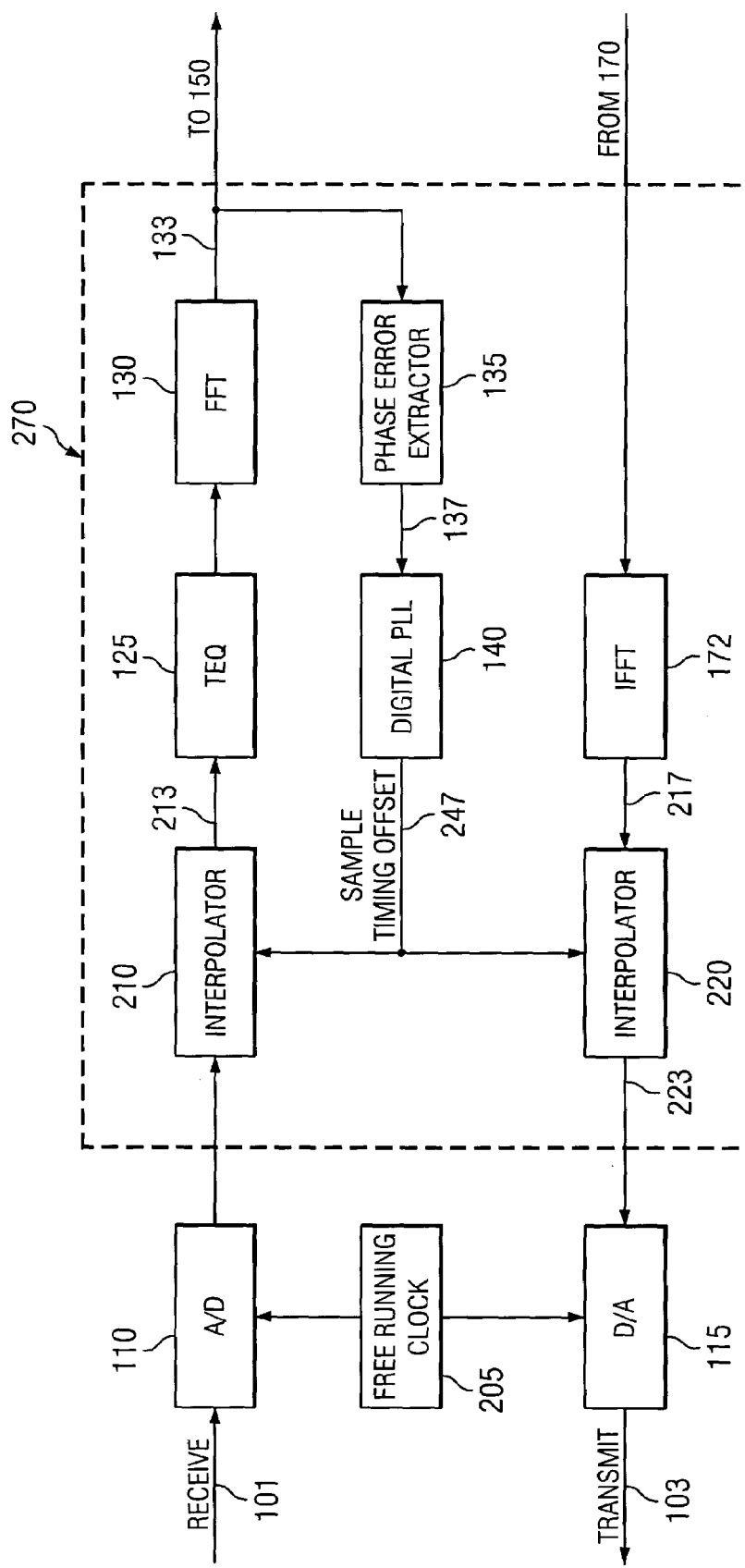
FIG. 2 diagrammatically illustrates an exemplary embodiment of interpolation based timing recovery in accordance with the present invention.

FIG. 2 diagrammatically illustrates exemplary embodiments of a communication apparatus including interpolation based timing recovery in accordance with the present invention to compensate for a frequency difference between the transmit and receive side sampling clocks. On the analog side, free running sampling clock 205 is the sampling clock for A/D 110, which receives analog signal 101, and D/A 115, which transmits analog signal 103. In the digital domain (enclosed by dashed box 270), the received samples with the correct sampling phase are generated by interpolator 210 and transmitted at 213 to time domain equalizer ("TEQ") 125. TEQ 125, Fast Fourier Transform ("FFT") 130 and phase error extractor 135 function as described with reference to FIG. 1. However, unlike the embodiment illustrated in FIG. 1, in the exemplary embodiments of FIG. 2, PLL 140 transmits sample timing offset signal 247 to interpolators 210 and 220. Interpolator 210 generates signal 213 based on signal 247. Frequency domain symbols in signals for transmission from the ATU-R are converted to time domain symbols by Inverse FFT ("IFFT") 172 and transmitted at 217 to interpolator 220. Interpolator 220, based on signals 217 and 247, generates samples that match the local (central office or "CO") sampling clock and transmits these samples at 223 to D/A 115, which converts signal 223 to analog signal 103 for transmission.

Figure 3:
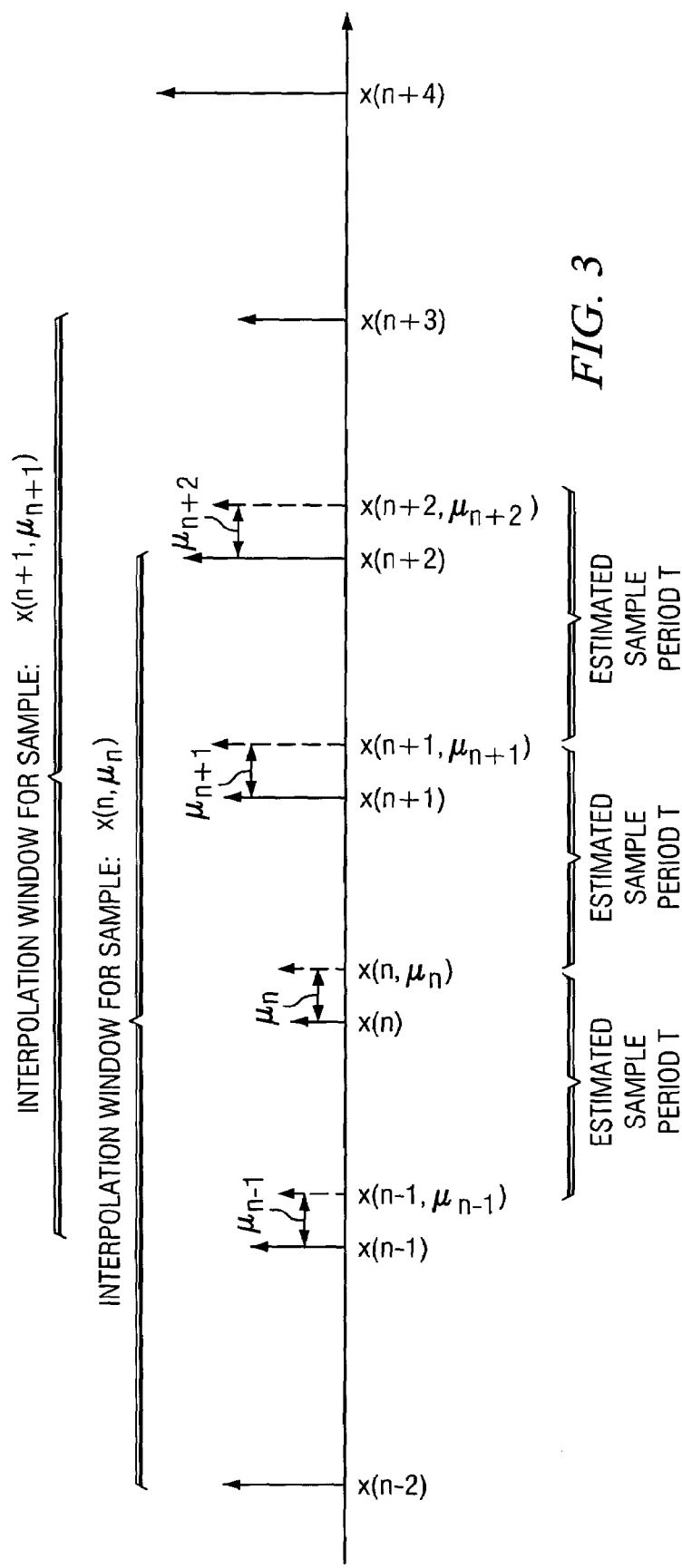
FIG. 3 diagrammatically illustrates an exemplary embodiment of timing recovery using interpolation in accordance with the present invention.

Sample timing offset signal 247 can be estimated for every desired sample from its neighboring sample. The timing offset and a predetermined number of its neighboring samples can be used to interpolate the desired sample as shown in equation (1) below:

$$x(n, \mu) = \sum_{k=-N}^{M} x(n-k) h_k(\mu) \qquad \text{Equation 1}$$

in which $h_k(\mu)$ represents the interpolation coefficient which is timing offset dependent. FIG. 3 diagrammatically illustrates an exemplary embodiment of timing recovery using interpolation in accordance with the present invention. In FIG. 3, the received samples are: $x(n-2)$, $x(n-1)$, $x(n)$, $x(n+1)$, $x(n+2)$, $x(n+3)$ and $x(n+4)$. The symbol $\mu_n$ represent the timing offset of the desired sample $x(n, \mu_n)$ from its reference sample $x(n)$. The desired sample $x(n, \mu_n)$ can be generated by interpolation based on the timing offset $\mu_n$ and its neighboring received samples: $x(n-2)$, $x(n-1)$, $x(n)$, $x(n+1)$, and $x(n+2)$. Using the timing offset $\mu_n$ and the estimated correct sample period T of an incoming signal, the timing offset $\mu_{n+1}$ can be estimated. Then, the desired sample $x(n+1, \mu_{n+1})$ can be interpolated based on the timing offset $\mu_{n+1}$ and its neighboring received samples: $x(n-1),x(n),x(n+1),x(n+2)$, and $x(n+3)$. In this manner, interpolation based timing recovery, in accordance with exemplary embodiments of the present invention, estimates the timing offset for every desired sample and interpolates the sample based on its timing offset and its neighboring samples.

A key element for interpolation based timing recovery is the design of efficient interpolation filters that can generate samples based on the varying sample timing offsets. Therefore, in some embodiments, the interpolation filter of the present invention can be compared to a fractional delay filter which is capable of generating samples with a delay of a fractional sample period. There are many techniques known in the art for designing fractional delay filters. For expositional purposes, a Farrow structure, which is capable of providing continuously adjustable delay, is used herein for the design of a fractional delay finite impulse response ("FIR") interpolation filter in accordance with an exemplary embodiment of the present invention.

When designing a Farrow structured interpolation filter, each interpolation filter coefficient $h_k(\mu)$ can be modeled as a $P^{th}$-order polynominal of timing offset $\mu$ as follows:

$$h_k(\mu) = \sum_{m=0}^{P-1} c_m(k) \mu^m \qquad \text{Equation 2}$$

where $k=-N, \ldots, M$ and $0 \leq \mu \leq 1$ (i.e., $\mu$ is normalized with respect to the sampling period of clock 205). The coefficients of the Farrow interpolation filter can be obtained by minimizing the following quadratic error:

$$\int_0^1 \int_{-\pi}^{\pi} \left| e^{-j\omega\mu} - \sum_{k=-N}^{M} \left( \sum_{m=0}^{P-1} c_m(k) \mu^m \right) e^{-jk\omega} \right|^2 d\omega \, d\mu. \qquad \text{Equation 3}$$

The Farrow interpolation filter should be designed to approximate an ideal fractional delay filter. The transfer function for an ideal fractional delay filter is:

$$h_{ideal} = e^{-j\omega\mu}. \qquad \text{Equation 4}$$

Therefore, the Farrow interpolation filter coefficients, such as $c_m$, can be designed by minimizing the quadratic errors between the ideal fractional delay transfer function and the interpolation filter transfer function over all the frequencies, $\pi<\omega<\pi$, and all the timing offsets, $0<\mu<1$). The transfer function of the Farrow interpolation filter can then be rearranged in accordance with:

$$H(z,\mu) = \sum_{k=-N}^{M} h_k(\mu)z^{-k} = \sum_{k=-N}^{M}\left[\sum_{m=0}^{P-1} c_m(k)\mu^m\right]z^{-k} = \sum_{m=0}^{P-1}\left[\sum_{k=-N}^{M} c_m(k)z^{-k}\right]\mu^m.$$

Equation 5

Therefore, the Farrow filter can be implemented as P time invariant FIR filters, each of which has the following transfer function:

$$H_m(z) = \sum_{k=-N}^{M} c_m(k)z^{-k}$$

Equation 6

Figure 4:
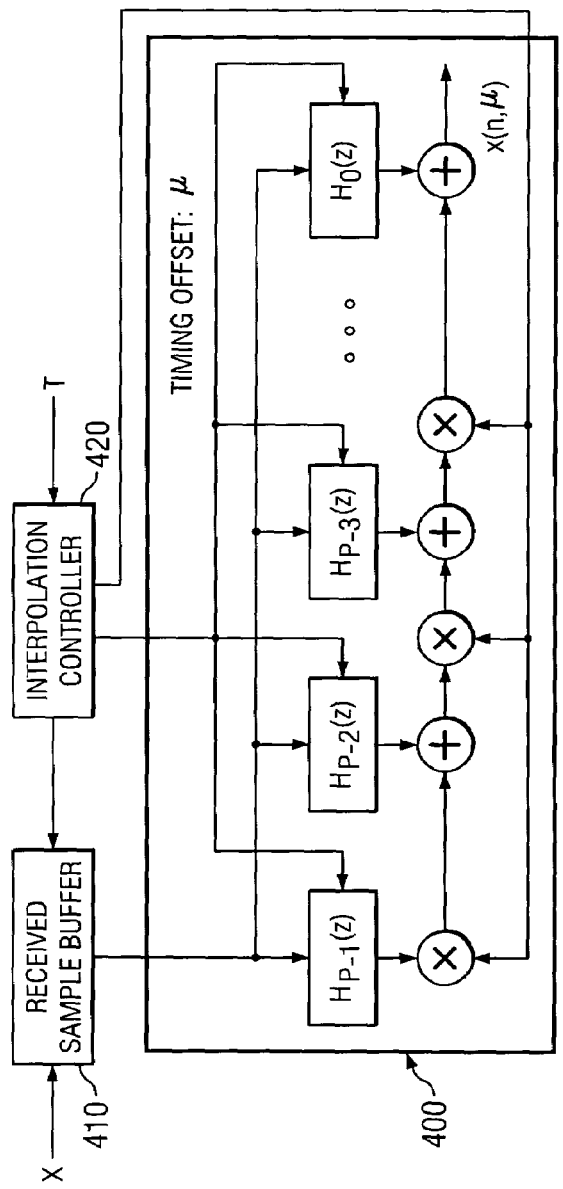
FIG. 4 diagrammatically illustrates an exemplary embodiment of a $P^{th}$-order Farrow interpolation filter in accordance with the present invention.

FIG. 4 diagrammatically illustrates an exemplary embodiment of a $P^{th}$-order Farrow interpolation filter in accordance with the present invention. An advantage of using a Farrow interpolation filter is that it uses the same filter coefficients for all the possible timing offsets. Therefore, the interpolation filter coefficient does not need to be recalculated for every sample, resulting in reduced computational complexity. The only computations related to the timing offset are P−1 multiplication operations of each filter output with the timing offset $\mu$ (each multiplier accounts for the appropriate power to which $\mu$ is raised, as required by Equation 5) and P−1 addition operations, as shown in FIG. 4. An implementation of sample interpolation in accordance with exemplary embodiments of the present invention can include (1) estimating the timing offset of every desired sample, (2) based on the timing offset, updating the sample delay line of the Farrow interpolation filter (if necessary) by shifting out old samples and shifting in new samples to provide to the Farrow filter the appropriate samples corresponding to x(n−k) in Equation 1, and (3) interpolating the desired sample from the timing offset and the new samples. In some exemplary embodiments, P=4, N=2 and M=3. Usually, a higher order filter (higher value of P) and longer filter taps (higher values of N and M) result in better modem performance, but also increase computational complexity. Therefore, in some exemplary embodiments, the goal is to use the minimum order (P) and minimum filter length (N and M) to achieve acceptable performance.

The timing offset update for each desired sample can be calculated, for example, as summarized by the following pseudo-code:

$\mu_{current}=\mu_{pre}+T$ sample$_{count=int(\mu_{current})}$ $\mu_{current}=\mu_{current}-$sample_count, where $\mu_{pre}$ and $\mu_{current}$ represent the timing offsets of previous and current desired samples, respectively. At the beginning of modem training, some embodiments set $\mu_{pre}=0$. The number of samples to be shifted into the sample delay line of the interpolation filter is represented by sample_count. T represents the estimated sampling period of the transmitter (e.g., ATU-C) relative to the sampling period of the clock 205 (e.g., T=0.9 would represent a transmitter clock running at 10/9 the rate of clock 205, and T=1.1 would represent a transmitter clock running 10/11 the rate of clock 205). As an example, if x is a DMT (discrete multi-tone) signal, T can be estimated, or updated, at every DMT frame by a digital PLL, such as PLL 140 (FIGS. 1, 2 and 6) and used to estimate the timing offsets for all the desired samples of the ensuing DMT frame. In some exemplary embodiments, the number of samples to be shifted into the sample delay line of the interpolation filter (sample_count) can have three (3) possible values: 0, 1 and 2. The value of sample_count can also be used to select the sample to which timing offset $\mu$ is referenced. In some exemplary embodiments, timing offset $\mu$ for the interpolated sample should be computed relative to its nearest sample.

Figure 5A:
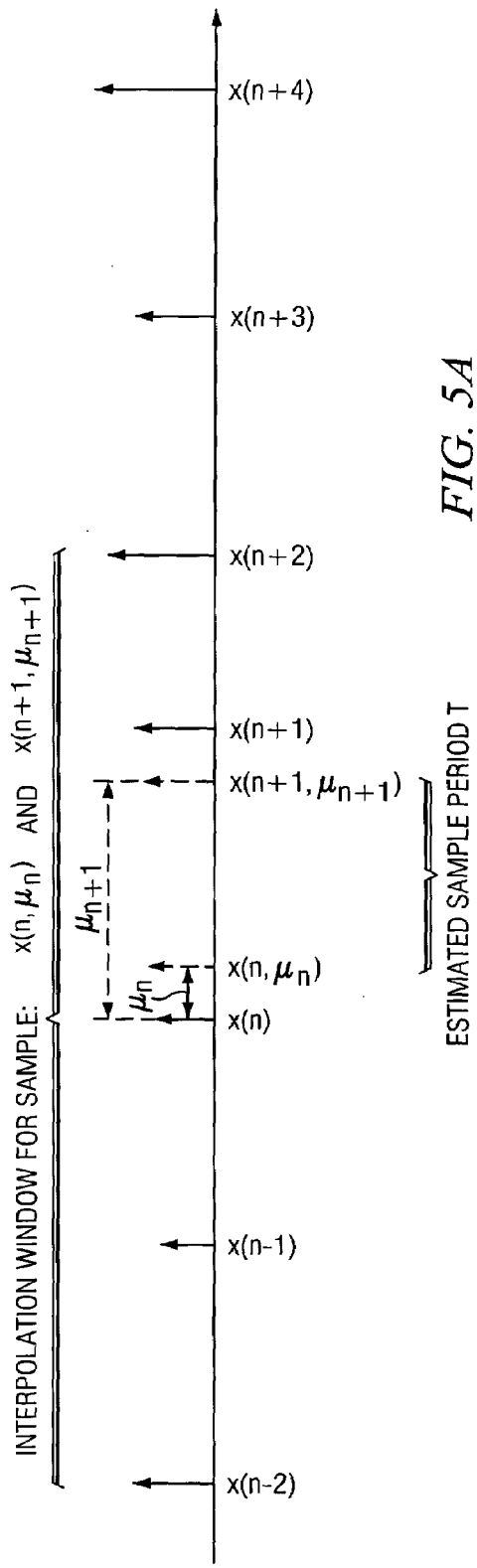
FIGS. 5A, 5B and 5C diagrammatically illustrate exemplary timing offsets for sample counts of 0, 1 and 2, respectively, in accordance with the present invention.

When the sample_count=0, both the previous and current desired samples occur in the same sample period between two (2) consecutive input samples, as illustrated in FIG. 5A. This can happen when the clock 205 is running slower than the sampling clock at the transmitter. When this occurs, there is no need to update the sample delay line of the interpolation filter because the two (2) consecutive desired samples can be interpolated by the same group of input samples. Additionally, although $x(n+1,\mu_{n+1})$ is closer to x(n+1), its timing offset is still relative to x(n). This is because the Farrow interpolation coefficients are optimized over the range of $0 \leq \mu \leq 1$, as discussed above. The reference sample for the desired sample can be chosen such that the timing offset will always be in the range of $0 \leq \mu \leq 1$.

Figure 5B:
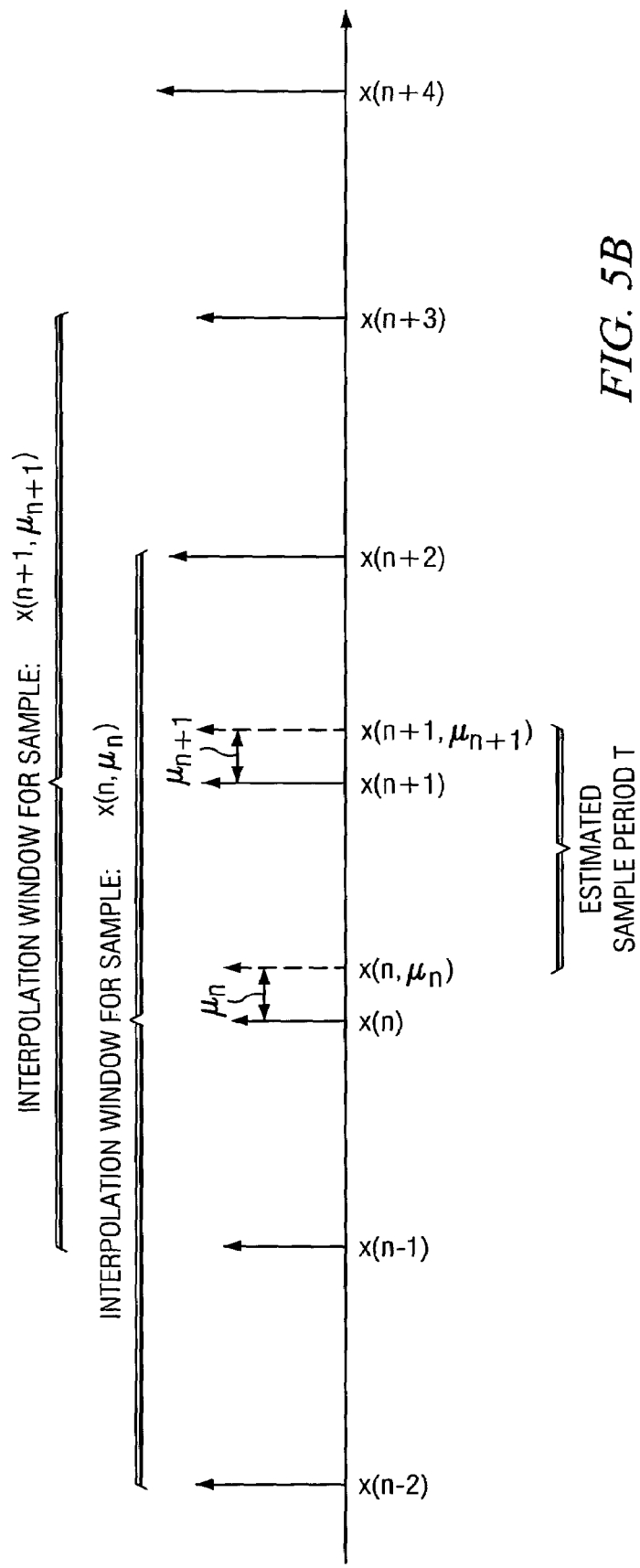

When the sample_count=1, the current desired sample occurs in the next sample period, as illustrated in FIG. 5B. When this occurs, one (1) new input sample can be shifted into the sample delay line of the interpolator and one (1) old sample can be shifted out.

Figure 5C:
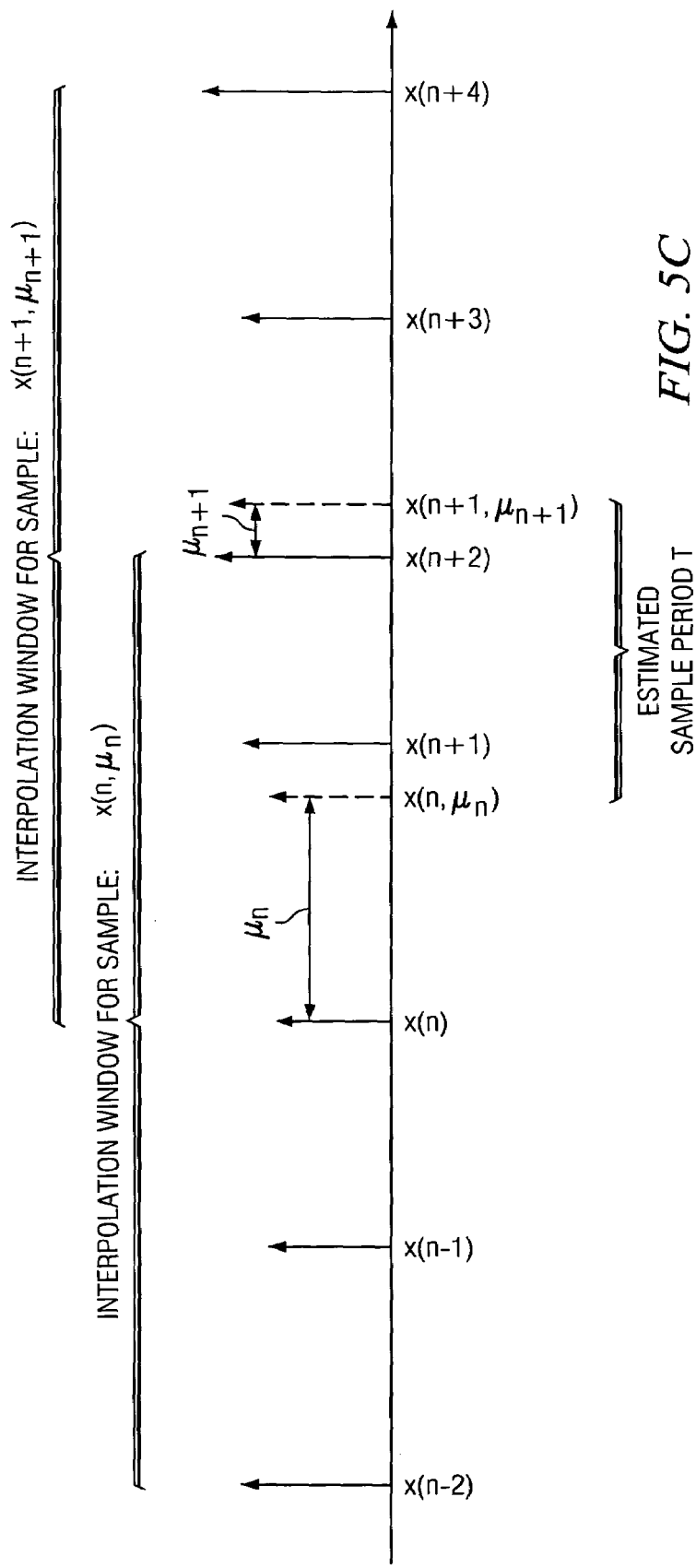

When the sample_count=2, the current desired sample occurs in the sample period after the next sample period, as illustrated in FIG. 5C. This can happen when clock 205 is running faster than the sampling clock at the transmitter. When this occurs, one (1) additional sample can be skipped in order to obtain the correct samples for interpolation. Therefore, two (2) new input samples can be shifted into the sample delay line of the interpolator and two (2) old samples can be shifted out. In some exemplary embodiments, the time period between the current interpolated sample, x(n,$\mu$), and the next-to-be-interpolated sample, x(n+1, $\mu_{n+1}$) can span two (2) received samples. In such embodiments, the second sample can be used as the reference sample to compute timing offset $\mu_{n+1}$ for the next-to-be-interpolated sample, x(n+1, $\mu_{n+1}$).

Figure 6:
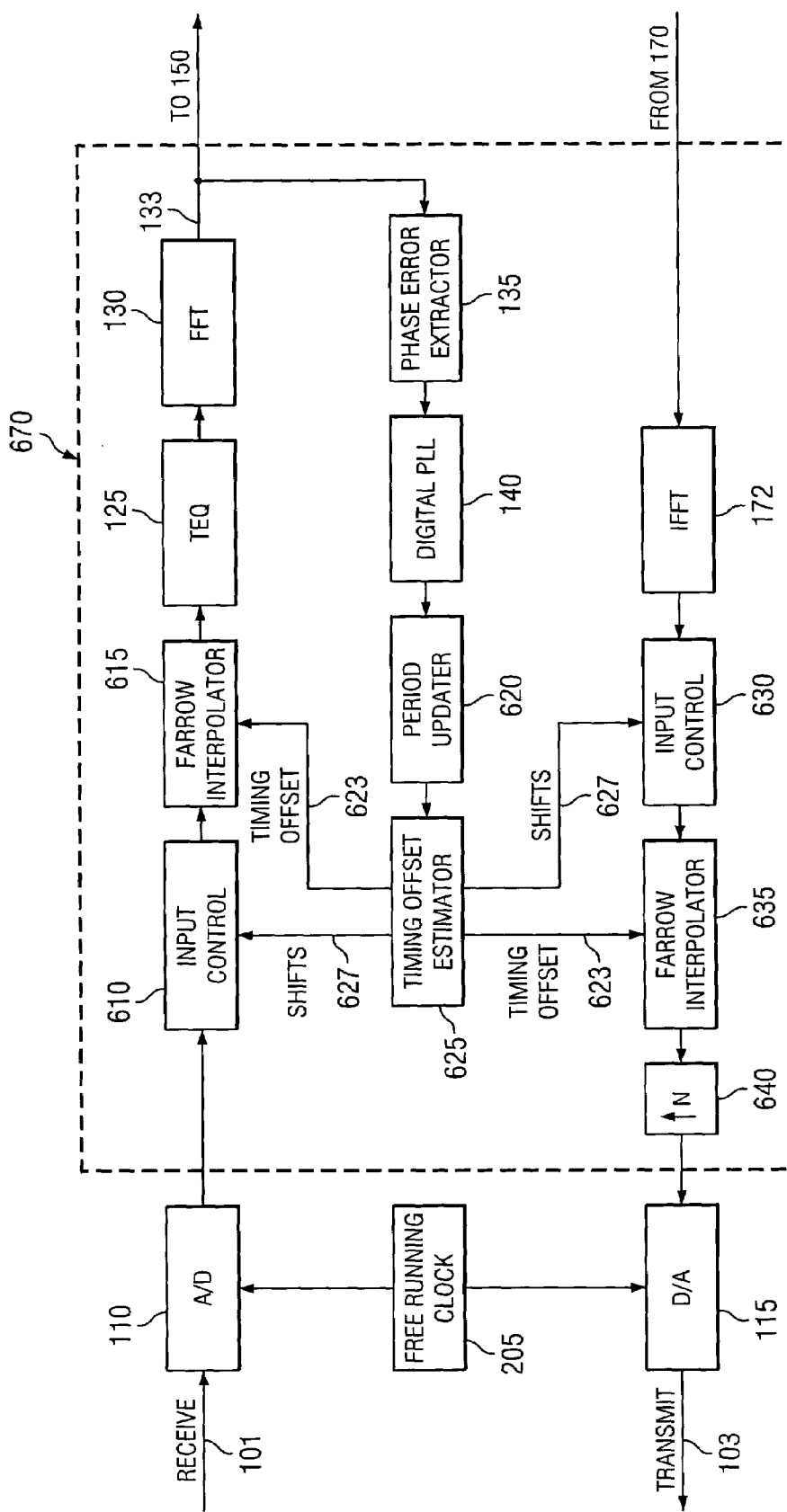
FIG. 6 diagrammatically illustrates an exemplary embodiment of interpolation based timing recovery in accordance with the present invention.

The sample interpolation described above can be implemented by a modem such as a DMT-based ADSL modem using a Farrow structure interpolation filter, as illustrated by the exemplary embodiment shown in FIG. 6. TEQ 125, FFT 130, phase error extractor 135 and IFFT 172 can function, for example, as described above with reference to FIGS. 1 and 2. Both A/D converter 110, which receives signal 101, and D/A converter 115, which transmits signal 103, use free running sampling clock 205. In digital domain 670, the desired receive sample, with the correct timing phase, can be generated by Farrow interpolation filter 615. The desired transmit sample, with the correct timing phase, can be generated by Farrow interpolation filter 635. In each DMT frame, PLL 140 generates a timing/frequency error. This error information is used by period updater 620 to produce an updated value of the estimated sampling period T. The sampling period T is used by timing offset estimator 625 to estimate the correct timing offset 623 ($\mu_{current}$ described above) for each sample of the ensuing DMT frame. Based on timing offset 623, Farrow interpolation filters 615 and 635 generate the desired receive and transmit samples, respectively, thereby compensating for the timing offset. Input control blocks 610 and 630 are responsive to a shifts signal 627 to shift the right amount of samples (determined by sample_count described above) into the sample delay lines of Farrow interpolation filters 615 and 635 for interpolating the new sample. The number of samples (i.e., sample_count described above) to be shifted into the delay line can be determined as previously described during the timing offset estimate. Because the downstream symbol rate is several times higher than the upstream symbol rate in ADSL, upsample block 640 can be used in some embodiments to increase the upstream symbol rate to match the downstream symbol rate. In some embodiments, a single Farrow interpolation filter, such as 615 and 635, can be used to perform interpolation in both the transmit and receive directions.

The timing offset estimator 625 and the input control block 610 of FIG. 6 respectively correspond to the interpolation controller 420 and the received sample buffer 410 of FIG. 4.

It will be evident to workers in the art that the exemplary embodiments described above can be readily implemented by suitable modifications in software, hardware or a combination of software and hardware in conventional modems, for example DMT-based ADSL modems.

Although exemplary embodiments of the present invention have been described in detail, it will be understood by those skilled in the art that various modifications can be made therein without departing from the spirit and scope of the invention as set forth in the appended claims.

What is claimed is:

1. A communication apparatus for communicating with a further communication apparatus via a communication medium, comprising:
    a communication port for coupling to the communication medium;
    a conversion apparatus for converting between respective analog and digital formats of a communication signal, including an analog port where said communication signal is presented in analog format, and a digital port where said communication signal is presented in digital format, said analog port coupled to the communication port with an input of an analog-to-digital converter and output of a digital-to-analog converter; and
    said conversion apparatus including a compensator coupled to said digital port for modifying sample values in said digital format communication signal to compensate for a frequency difference between a time base used by said conversion apparatus and a further time base used by the further communication apparatus,
        said compensator including a receive compensator having an input coupled to said output of said analog-to-digital converter, and a transmit compensator having an output coupled to said input of said digital-to-analog converter, said transmit compensator having an input, and said digital port including said input of said transmit compensator and said output of said analog-to-digital converter.

2. The apparatus of claim 1, wherein said compensator includes an input for receiving information indicative of said frequency difference, said compensator for modifying sample values in said digital format communication signal based on said frequency difference information.

3. The apparatus of claim 2, wherein said compensator includes an interpolator for interpolating among adjacent sample values of said digital format communication signal based on said frequency difference information.

4. The apparatus of claim 3, wherein said interpolator includes a fractional delay finite impulse response interpolation filter.

5. The apparatus of claim 4, wherein said fractional delay finite impulseresponse interpolation filter includes a Farrow interpolation filter.

6. The apparatus of claim 1, provided as a communication receiver apparatus, wherein said conversion apparatus includes an analog-to-digital converter having an input that defines said analog port and having an output that defines said digital port, said compensator having an input coupled to said output of said analog-to-digital converter.

7. The apparatus of claim 1, provided as a communication transmitter apparatus, wherein said conversion apparatus includes a digital-to-analog converter having an output that defines said analog port, said digital-to-analog converter having an input, said compensator having an output coupled to said input of said digital-to-analog converter, and said compensator having an input that defines said digital port.

8. The apparatus of claim 1, provided as a modem apparatus.

9. The apparatus of claim 8, wherein said modem apparatus is a Digital Subscriber Line (DSL) modem.

10. The apparatus of claim 9, wherein said Digital Subscriber Line (DSL) modem is an Asymmetric Digital Subscriber Line (ADSL) modem.

11. The apparatus of claim 1, wherein said communication signal is a Discrete Multi-Tone (DMT) signal.

12. A communication apparatus for communicating with a further communication apparatus via a communication medium, comprising:
    a timing source for providing a timing signal;
    a conversion apparatus coupled to said timing source for converting between respective analog and digital formats of a communication signal based on said timing signal, said conversion apparatus including an analog port where said communication signal is presented in analog format, and a digital port where said communication signal is presented in digital format, said analog port for coupling to the communication medium; said conversion apparatus including:
        a digital-to-analog converter having an output that defines said analog port, said digital-to-analog converter having an input;
        a compensator coupled to said digital port for compensating for a frequency difference between said timing signal and a further timing signal used by the further communication apparatus, said compensator having an output coupled to said input of said digital-to-analog converter and an input that defines said digital port; and
        said timing source operable independently of said compensator.

13. The apparatus of claim 12, wherein said compensator is for modifying sample values in said digital format communication signal to compensate for said frequency difference.

14. The apparatus of claim 13, wherein said compensator includes an interpolator for interpolating among adjacent sample values of said digital format communication signal.

15. The apparatus of claim 14, wherein said interpolator includes a fractional delay finite impulse response interpolation filter.

16. The apparatus of claim 15, wherein said fractional delay finite impulse response interpolation filter includes a Farrow interpolation filter.

17. The apparatus of claim 12, provided as a communication receiver apparatus, wherein said conversion apparatus includes an analog-to-digital converter having an input that defines said analog port and having an output that defines said digital port, said compensator having an input coupled to said output of said analog-to-digital converter.

18. The apparatus of claim 12, wherein said timing signal is a free running clock signal.

19. A communication apparatus for communicating with a further communication apparatus via a communication medium, comprising:
  a timing source for providing a timing signal;
  a conversion apparatus coupled to said timing source for converting between respective analog and digital formats of a communication signal based on said timing signal, said conversion apparatus includes an analog-to-digital converter and a digital-to-analog converter, an analog port where said communication signal is presented in analog format and a digital port where said communication signal is presented in digital format, said analog port including an input of said analog-to-digital converter and an output of said digital-to-analog converter, said conversion apparatus further includes a compensator coupled to said digital port for compensating for a frequency difference between said timing signal and a further timing signal used by the further communication apparatus; and said timing source operable independently of said compensator, said compensator including a receive compensator having an input coupled to said output of said analog-to-digital converter, and a transmit compensator having an output coupled to said input of said digital-to-analog converter, said transmit compensator having an input, and said digital port including said input of said transmit compensator and said output of said analog-to-digital converter.

* * * * *